(Model.)

P. R. ERLING.
Portable Galvanic Battery.

No. 237,733.  Patented Feb. 15, 1881.

Witnesses.
Wm Zimmerman
N. Cowles

Inventor.
Peter R. Erling
By Gridley & Co
Attys

UNITED STATES PATENT OFFICE.

PETER R. ERLING, OF CHICAGO, ILLINOIS.

PORTABLE GALVANIC BATTERY.

SPECIFICATION forming part of Letters Patent No. 237,733, dated February 15, 1881.

Application filed August 2, 1880. (Model.)

*To all whom it may concern:*

Be it known that I, PETER R. ERLING, of Chicago, in the county of Cook and State of Illinois, have invented a new and useful Portable and Flexible Galvanic Battery; and I declare the following to be a full, clear, and exact description thereof, which will enable others skilled in the art to which my invention appertains to make and use the same, reference being had to the accompanying drawings, which form a part hereof, and in which—

Figure 1:
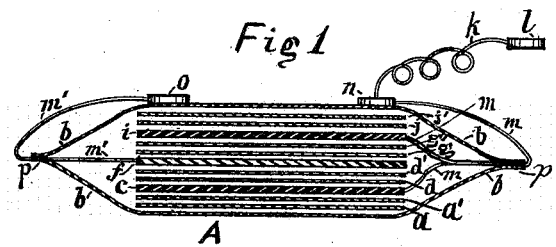
Figure 2:
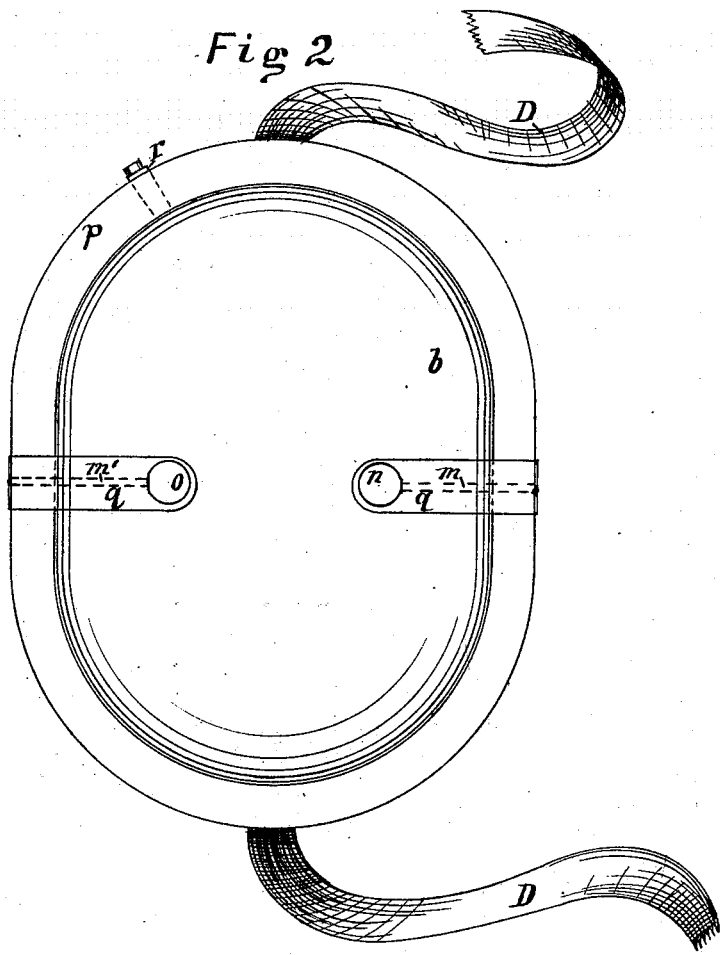

Figure 1 represents a cross-section of one of my batteries cut across through the electrodes, and Fig. 2 represents a plan view of the same.

Like letters of reference indicate like parts.

The object of my invention is to provide a portable and flexible galvanic battery to be used for medicinal purposes, and which may be locally applied, conform to, and be held upon any part of the body of the patient; and my invention consists in a galvanic "pile" constructed of flexible material and inclosed in a flexible and air and water tight cover or case, substantially as shown and described.

In the drawings, A represents the pile proper, which is made up or composed (commencing at the bottom) of two sheets of dry blotting-paper, $a\ a'$, or other equivalent material or fabric capable of receiving and retaining moisture. The upper surface of each sheet $a$ and $a'$ is dusted or covered with dry and coarse-powdered sulphate of copper. Upon the sheets $a\ a'$ thus prepared is placed a thin plate or piece of flexible sheet-copper, $c$, of the same size or dimensions as the sheets of blotting-paper, and upon which is placed another layer, or two sheets of blotting-paper, $d\ d'$, the upper surface of each of which is also covered with powdered dry and coarse sulphate of copper. Upon the paper $d\ d'$ is placed a plate or piece of thin and flexible sheet-zinc, $f$, and upon which is placed two pieces of blotting-paper, $g\ g'$, the upper surface of each of which is dusted or covered with dry powdered sulphate of zinc, upon which is placed a plate or piece of flexible copper, $i$, and upon which is also placed two pieces of blotting-paper, $j\ j'$, the upper surface of each of which is also dusted or covered with sulphate of zinc, and so on in the same order, making two elements of four alternate plates of copper and zinc.

The copper plates are connected by means of a copper wire or strip of copper, $m$, which is continued and carried outside of the case, hereinafter described, and to the end of which wire is attached a brass disk, forming the positive electrode $n$ of the battery, and the zinc plates are connected in a similar manner by a wire, $m'$, and to a brass disk, $o$, forming the negative electrode of the battery.

The pile or battery thus prepared is placed in a case, $b$, which is made of rubber cloth or other equivalent flexible material or fabric that is impervious to moisture and of any desired dimensions, and after the pile A is placed therein the case is thoroughly closed and made air and water tight, except a small opening between the borders or edges of the cloth, in which is inserted and securely attached a small tube, $r$, by cementing the open edges $p$ thereof together by any suitable cement. The electrodes $n$ and $o$, after being attached to the connecting-wires $m$ and $m'$, are fastened or cemented, respectively, to a piece of rubber cloth, $q$, which is also cemented to the outer surface of the case, at or near the sides or ends thereof, as shown.

To use the flexible galvanic battery constructed as above described, it is only necessary to pour about a table-spoonful of water into the pile or battery through the tube $r$ and then close the tube by means of a suitable cork or stopper, so as to prevent leakage or evaporation. The paper takes up the water, and thereby a portion of the sulphates of copper and zinc is dissolved, which produces the necessary acid solution to act on the metals, and causes a constant galvanic current between the electrodes, and along the surface of the skin when the battery is applied and held in the desired position, by means of the bands D, upon any portion of the body of the patient.

To produce general effects or general galvanization of the body of the patient, a separate or third electrode, $l$, is used, and which is connected to one of the permanent electrodes by means of a fine insulated copper wire, $k$, of the desired length and placed in contact with the skin at the desired point or place. Thus, for the galvanization of the whole length of the spine, one of the permanent electrodes of the battery is placed in contact with the body at the lower end of the spine, (the other permanent electrode being insulated in any known manner,) and the extra electrode is placed at the upper end of the spine, and thereby a current is caused to pass the whole length of the spine from one pole of the battery to the other.

By constructing the battery as above described I am enabled to furnish to the general public for use for medicinal purposes a simple, cheap, and convenient galvanic battery, which can be readily applied and made to conform to any part of the body of the patient, and by reason of its being inclosed in an air-tight case prevents evaporation, and thereby retains its strength or quality for a considerable time, and can be readily renewed by the application of water, as above described.

The elements, as shown, in the pile A are separated, so as to more clearly distinguish the different parts, but as constructed they are all in actual contact.

The covers or patches $q$ are intended to protect the wires $m$ $m'$ from injury. In Fig. 1 these wires are shown free and the patches $q$ omitted.

Having thus described my invention, what I claim as new, and desire to secure by Letters Patent, is—

1. A flexible galvanic battery inclosed within an air and water tight and flexible case, substantially as shown and described.

2. A portable and flexible galvanic battery consisting of blotting-paper covered with powdered sulphate of copper, flexible copper plates, blotting-paper covered with powdered sulphate of zinc, flexible zinc plates, connecting-wires, electrodes, and an air and water tight and flexible and portable case, all constructed and arranged substantially as and for the purpose specified.

3. The electrode $l$, insulated conducting-wire $k$, insulated electrode $n$, and electrode $o$, in combination with a flexible and portable galvanic battery, substantially as and for the purpose shown and described.

PETER R. ERLING.

Witnesses:
WM. ZIMMERMAN,
N. COWLES.